US011753925B2

(12) United States Patent
Hardeman et al.

(10) Patent No.: US 11,753,925 B2
(45) Date of Patent: Sep. 12, 2023

(54) APPARATUS AND RELATED METHODS TO DETERMINE HOLE CLEANING, WELL BORE STABILITY AND VOLUMETRIC CUTTINGS MEASUREMENTS

(71) Applicant: Baker Hughes, a GE Company, LLC, Houston, TX (US)

(72) Inventors: Stuart E. Hardeman, The Woodlands, TX (US); William Metcalf, Lafayette, LA (US); Robert Guidry, Youngsville, LA (US); Kassie E. Mobley, Katy, TX (US); Sean Oliver, New Iberia, LA (US); Joshuah A. Granados, Houston, TX (US); Michael L. Paul, Opelousas, LA (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/670,295

(22) Filed: Feb. 11, 2022

(65) Prior Publication Data

US 2022/0372863 A1    Nov. 24, 2022

Related U.S. Application Data

(63) Continuation of application No. 16/796,546, filed on Feb. 20, 2020, now abandoned, which is a continuation of application No. 14/941,072, filed on Nov. 13, 2015, now abandoned.

(51) Int. Cl.
*E21B 47/003* (2012.01)
*E21B 21/06* (2006.01)

(52) U.S. Cl.
CPC .......... *E21B 47/003* (2020.05); *E21B 21/065* (2013.01)

(58) Field of Classification Search
CPC ............................. E21B 47/003; E21B 21/065
See application file for complete search history.

(56) References Cited

U.S. PATENT DOCUMENTS

| 2,953,681 | A | * | 9/1960 | Frazier | G01F 1/64 |
| | | | | | 378/54 |
| 4,010,857 | A | * | 3/1977 | Reim | G01N 23/12 |
| | | | | | 414/160 |
| 4,205,230 | A | * | 5/1980 | Stubbs | G01F 1/64 |
| | | | | | 378/54 |
| 4,582,992 | A | * | 4/1986 | Atwell | G01N 23/222 |
| | | | | | 250/359.1 |

* cited by examiner

*Primary Examiner* — Jonathan Malikasim
(74) *Attorney, Agent, or Firm* — Crowe & Dunlevy, P.C.

(57) ABSTRACT

A method for estimating a parameter relating to solids recovered from a wellbore includes drilling a wellbore using a bottomhole assembly; conveying solids in the wellbore to the surface using drilling fluid; separating the drilling fluid from the solids; and continuously dropping the solids into a solids evaluator positioned above a dryer. The solids evaluator includes a chute having a vertically aligned bore in which the dropped solids reach a constant velocity, a sensor assembly generating a microwave field, and a control unit. The control unit estimates a mass flow rate of the solids based on the generated signals. The method may further include generating the signals representative of a mass flow rate of the dropped solids using the sensor assembly and using the control unit to estimate the mass flow rate of the solids based on the generated signals.

15 Claims, 3 Drawing Sheets

APPARATUS AND RELATED METHODS TO DETERMINE HOLE CLEANING, WELL BORE STABILITY AND VOLUMETRIC CUTTINGS MEASUREMENTS

CROSS-REFERENCE TO RELATED APPLICATIONS

This application is a continuation of U.S. patent application Ser. No. 16/796,546, filed Feb. 20, 2020, which is a continuation of U.S. patent application Ser. No. 14/941,072, filed Nov. 13, 2015, the disclosure of which is incorporated herein by reference in its entirety.

1. FIELD OF THE DISCLOSURE

This disclosure is directed to systems and related methods for estimating one or more subsurface parameters. Such parameters may relate to a drilled borehole, drilling equipment, a formation, and/or fluids in the formation.

2. BACKGROUND OF THE DISCLOSURE

To obtain hydrocarbons such as oil and gas, boreholes or wellbores are drilled by rotating a drill bit attached to the bottom of a drilling assembly (also referred to herein as a "Bottom Hole Assembly" or ("BHA"). The drilling assembly is attached to the bottom of a tubing, which is usually either a jointed rigid pipe or a relatively flexible spoolable tubing commonly referred to in the art as "coiled tubing." During drilling, a drilling fluid (also referred to as the "mud") is supplied under pressure into the tubing. The drilling fluid passes through the drilling assembly and then discharges at the drill bit bottom. The drilling fluid provides lubrication to the drill bit and carries to the surface rock pieces disintegrated by the drill bit in drilling the wellbore. The drilling fluid and entrained materials return to the surface where they are processed.

The present disclosure provides information relating to the borehole by analyzing the materials carried by the drilling fluid to the surface.

SUMMARY OF THE DISCLOSURE

In aspects, the present disclosure provides a method for estimating a parameter relating to solids recovered from a wellbore. The method may include the steps of flowing the solids at a constant velocity through a microwave field, wherein the solids were separated from a drilling fluid recovered from the wellbore; generating signals representative of a mass of the flowing solids; and estimating a mass flow rate using the generated signals.

In aspects, the present disclosure provides a further method for estimating a parameter relating to solids recovered from a wellbore. The method may include drilling a wellbore using a bottomhole assembly; conveying the solids in the wellbore to a surface location using a drilling fluid; separating the drilling fluid from the solids using at least one shaker; conveying substantially all of the separated solids by using a conveyor; continuously dropping the solids into a solids evaluator positioned vertically above the dryer. The solids evaluator may include a chute having a vertically aligned bore, the chute having a length selected to allow the dropped solids to reach a constant velocity, a sensor assembly generating a microwave field in a section of the chute where the dropped solids have the constant velocity, and a control unit in signal communication with the sensor assembly. The control unit may be configured to estimate a mass flow rate of the solids based on the generated signals. The method may further include the steps of generating the signals representative of a mass flow rate of the dropped solids using the sensor assembly; using the control unit to estimate the mass flow rate of the solids based on the generated signals; and drying the solids in a dryer.

In aspects, the present disclosure provides an apparatus for estimating a parameter relating to solids recovered from a wellbore wherein the solids are dropped from a conveyance device. The apparatus may include a chute having a vertically aligned bore, the chute having a length selected to allow the dropped solids to reach a constant velocity, a sensor assembly generating a microwave field in a section of the chute where the dropped solids have the constant velocity, the sensor assembly generating signals representative of a mass flow rate of the dropped solids, and a control unit in signal communication with the sensor assembly, the control unit being configured to estimate a mass flow rate of the solids based on the generated signals.

Examples of certain features of the disclosure have been summarized (albeit rather broadly) in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE FIGURES

For detailed understanding of the present disclosure, reference should be made to the following detailed description of the preferred embodiment, taken in conjunction with the accompanying drawing.

DETAILED DESCRIPTION OF THE DISCLOSURE

Embodiments of the present disclosure may be used to estimate one or more subsurface parameters by evaluating rock, earth, and other debris carried by drilling fluid to the surface during drilling. Such parameters may relate to a drilled borehole, drilling equipment, a formation, and/or fluids in the formation. The present teachings may be used for land-based drilling or offshore operations. Merely for brevity, an offshore rig will be used as a context to describe illustrative embodiments of the present disclosure.

Figure 1:
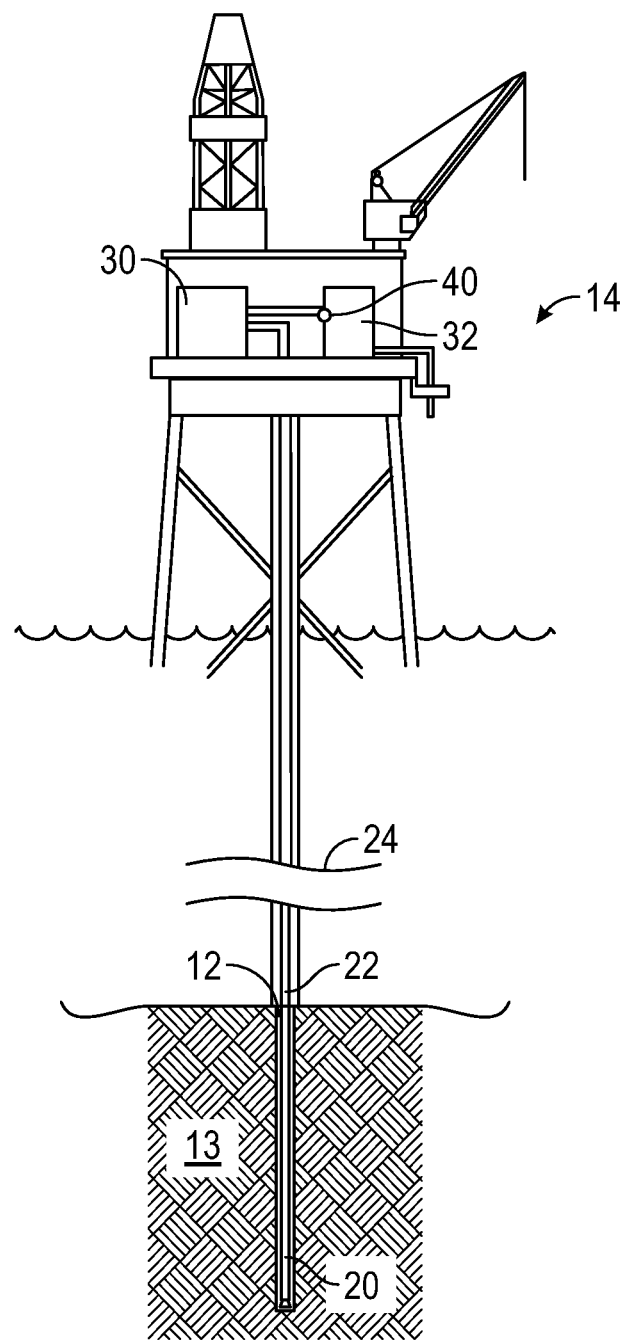
FIG. 1 illustrates an offshore rig that may use a solids evaluator of the present disclosure during drilling operations.

FIG. 1 shows a schematic elevation view of a drilling system 10 for drilling subsea wellbore 12 in an earthen formation 13. The drilling system 10 includes a drilling platform 14, which may be a drill ship or another suitable surface work station such as a floating platform or a semi-submersible. The subsea wellbore 12 is drilled by a drill bit of a bottom hole assembly ("BHA") 20 carried by a suitable drill string 22, such as continuous coiled tubing, drill pipe or other suitable jointed tubulars such as liner or casing. During drilling, a drilling fluid from a surface mud system is pumped under pressure down the tubing 22. The drill bit, when rotated, disintegrates the formation (rock) into cuttings. The drilling fluid leaving the drill bit travels uphole through the annulus between the drill string and the wellbore wall carrying the entrained drill cuttings. The returning drilling fluid may also carry particles, such as sand or silt, from the formation and "cavings," which are rocks and debris that have broken off from a borehole wall. For convenience, all such material will be collectively referred to as "cuttings." Moreover, "cuttings" and "solids" will be used interchangeably. A return line 16, which may be a riser, carries the fluid returning from the wellbore 12, along with all such entrained material, to the sea level.

Conventionally, the rig 14 may include systems for processing the entrained material and drilling fluid. For instance, the rig may include one or more shakers 30 that separate the drilling fluid from the entrained material and one or more dryers 32 that clean and dry the separated entrained material.

In embodiments, the rig 14 may include a solids evaluator 40 that is configured to analyze the separated entrained material and provide drilling personnel with information that can assist in controlling drilling operations. In some embodiments, personnel may be provided an estimate of the actual quantity of solid material being recovered. Such information may assist evaluating theoretical hole cleaning and/or modeling the stability of the wellbore. Such information may also highlight operational problems such as cuttings bed build-up, show effectiveness of actions (drilling changes, sweeps, mud changes, etc), assist in optimizing operations (e.g., ROP control, mud rheology, surface RPM range, etc), and help minimize unnecessary rig operations (e.g., wiper trips, reaming at connection, non-essential sweeps etc.).

Figure 2:
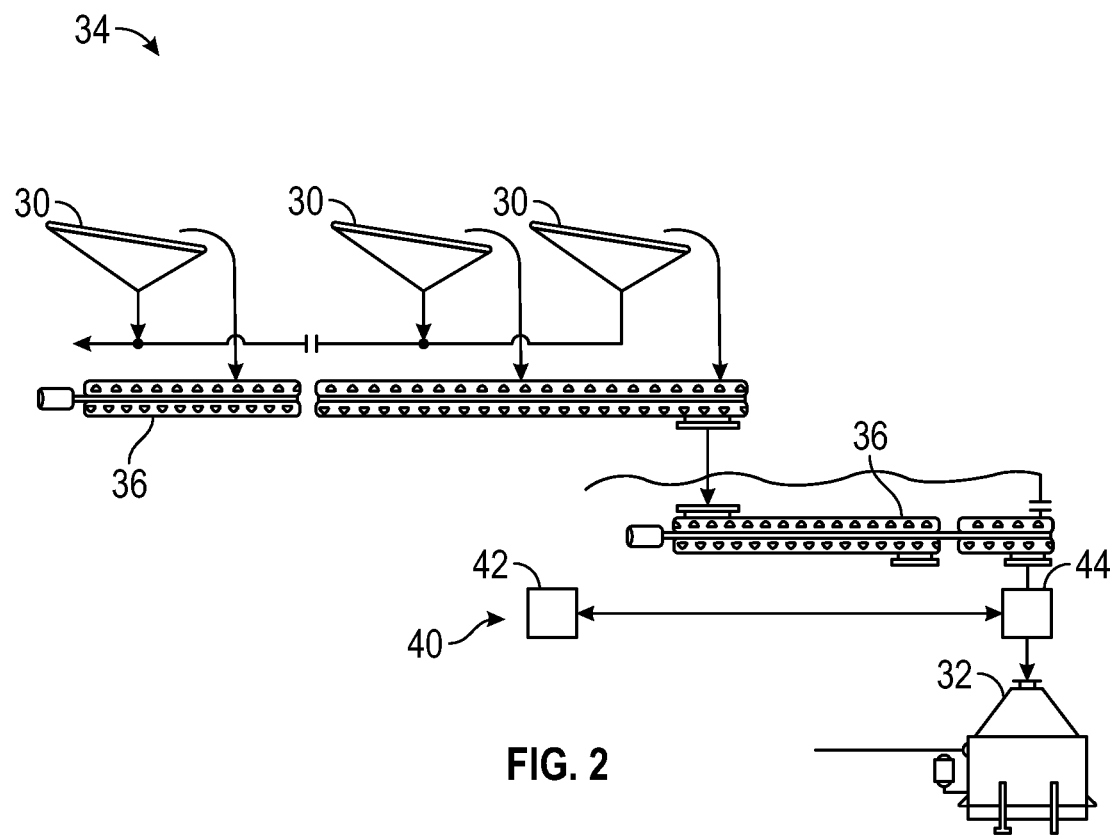
FIG. 2 schematically illustrates a solids evaluator in accordance with one embodiment of the present disclosure used in conjunction with a drill cuttings processing system.

Referring to FIG. 2, there is shown one non-limiting system 34 for processing drilling fluids and entrained materials. The system 34 may include one or more shakers 30, a conveyor system 36, and one or more dryers 32. The shakers 30 capture the cuttings and large solids from the drilling fluid recovered from the wellbore 12 (FIG. 1). A screen (not shown) is fitted on each shaker of certain mesh size and is vibrated to facilitate separation of the majority of fluids from the solids. The conveyor system 36, which include augers, collects the separated solids from all of the shakers 30 and conveys the solids to the dryer 32. The solids free fall from the conveyor system 36 into the dryer 32. In other embodiments, the solids free fall into another conveyor (not shown), a container, or other structure. That is, the solids do not necessarily have to free fall directly into the dryer 32. Also, it should be noted that the solids exiting the conveyor 36 comprise all or substantially all of the solids that have been recovered from the wellbore 12 (FIG. 1). By substantially, it is meant at least seventy percent or at least enough to furnish information representative of subsurface conditions to an accuracy known to those skilled in the art.

In embodiments, the solids evaluator 40 may be used to estimate one or more parameters associated with the solids travelling from the conveyor 36 to the dryer 32. In one embodiment, the solids evaluator may include a sensor assembly 42 and a control system 44. In one arrangement, the sensor assembly 42 uses one or more microwave sensors to generate signals that characterize the separated solids. The sensor signals may be analog and/or digital and transmitted through cables or wirelessly.

The control system 44 may be in signal communication with the sensor assembly 42. The communication can be bi-directional, which may allow the control system 44 to control the sensor assembly 42. The control system 44 may be positioned on the rig 14 or located at a remote location, which may be onshore and possibly thousands of miles away. To process the sensor signals, the control system 44 may include known equipment such as transceivers, microprocessors, memory modules loaded with algorithms, databases, etc. In some arrangements, the sensor information may be received as an estimated mass flow rate, given in tons/hour.

Figure 3:
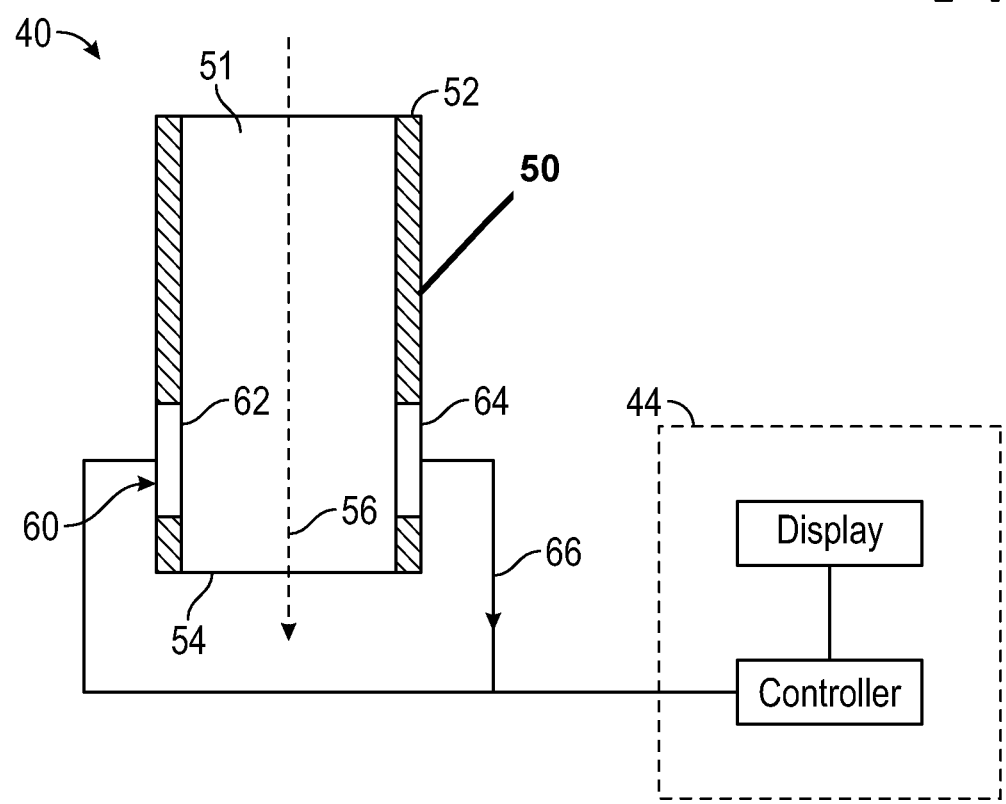
FIG. 3 schematically illustrates a solids evaluator in accordance with one embodiment of the present disclosure.

Referring now to FIG. 3, there is shown a solids evaluator 40 that may be used to estimate one or more parameters associated with the solids travelling from the conveyor 36 to the dryer 32. In one embodiment, the solids evaluator 40 may include a chute 50 and a sensor unit 60. The chute 50 may be a thin-walled duct-type structure having a bore 51 that is vertically aligned. The vertical alignment allows solids to free-fall through the chute 50 with minimal obstruction. By "free-fall," it is meant that gravity is the principal force moving the solids and that the solids are moving in primarily a vertical direction. In some embodiments, the chute 50 may be a barrel-shaped tubular, but in other embodiments may have a non-circular shape (e.g., rectangular shape). Further, the chute 50 may have a non-varying cross-sectional flow area or a funnel-like shape wherein an inlet 52 is larger than the outlet 54. In embodiments, the chute has a length sufficient to allow the free falling solids in the bore 51 to reach a constant velocity before reaching the sensor unit 60. The chute 50 positions the sensor unit 60 above the dryer 32 (FIG. 2) and orients the sensor unit 60 such that the microwaves radiate perpendicular to the flow of cuttings 56. The sensor unit 60 may be relatively compact and require minimal space for installation, e.g., roughly about 12 inches. Because microwaves are used, the sensor system 60 is minimally invasive and has no moving parts.

The sensor unit 60 may be a microwave-based device that generates an electromagnetic field through which the falling solids passes. In one arrangement, the sensor unit 60 may include one or more microwave sensors 62 and a receiver 64 that are positioned at a location along the bore 51 where the solids have a constant velocity. The sensor 62 may be positioned to have an angular offset from a direction of motion of the solids (e.g., ninety degrees) and configured to emit a beam that completely traverses the cross-sectional flow path of the chute 50. In embodiments, the microwave field is positioned such as to detect the free falling solids after the solids have reached a constant velocity. As the solids move through the microwave field, the microwaves contacting the solids undergo a Doppler shift, which is then detected by the receiver 64. The receiver 64 is positioned to detect the reflected waves and generate an electrical signal 66 that is proportional to the concentration of the solids flowing through the chute 50. The sensor signal 66 may be transmitted to the control system 44 for processing.

In an exemplary use, personnel may first assemble information that may be useful for estimating the desired wellbore characteristics and operating efficiency. Without limitation, this information may include, actual or estimated rate of penetration (ROP), drill bit rotation (RPM), drilling mud properties, drill bit diameter, actual or estimated drilling mud circulation rates, formation lithology, etc. The density of the solids may be determined by testing the recovered solids, testing samples taken from the formation, and/or by using lithology/mineral reference guides. Thus, the density is predetermined, i.e., determined before the solids evaluator 50 is operated. Also, the system 44 may be calibrated to ensure that the sensor assembly 60 only measures moving solids as opposed to deposits and/or build ups. For example, the amplitude and frequency of the microwaves can be adjusted in order to obtain an estimate of solids flow within a pre-determined accuracy.

During an exemplary wellbore drilling operation, the BHA 20 disintegrates the formation and produces cuttings entrained in the circulating drilling fluid. After being separated from the drilling fluid by the shakers 30, the cuttings, or solids, the conveyors 66 continuously drop these solids into the chute 50. By continuous, it is meant that the flow of solids is uninterrupted and the downward flow is not halted at an intermediate location prior to entering the dryer 32 or other structure. Thus, the dropped solids move flow in the aggregate much like a continuous body and are evaluated while in motion. This is in contrast to "batch" operations wherein discrete quantities are periodically dispensed or captured. The sensor assembly 60 generates a microwave field that completely traverses a cross-sectional flow path of the dropped solids and is perpendicular to the flow of the dropped solids. The sensor assembly 60 generates an output that may be tons per hour. The control system 44 converts the sensor output into a volumetric measurement using information such as the estimated density of the material making up the solids.

Once converted, this measurement may be plotted against theoretical hole volume. Through utilization of lag calculations and theoretical volume calculations, personnel may display plots of the theoretical cuttings volume to the actual cuttings volume and the difference (if any) between the two. The differences may provide insight into well conditions. For instance, actual cuttings volumes well below the theoretical cuttings volumes may indicate that hole cleaning is inefficient and is not adequately transporting cuttings to the surface. In contrast, actual cuttings volumes in excess of theoretical cuttings volumes may indicate that portions of the wellbore have collapsed (caving). Another usage may involve estimating a volumetric flow rate using the estimated mass flow rate and an estimated density of the solids and then comparing the estimated volumetric flow rate with a theoretically volumetric flow rate.

Based on the determined differences, a well operator may adjust one or more drilling parameters. A drilling parameter is any condition or operating set-point that can be controlled. Illustrative, but not exhaustive drilling parameters include, ROP, weight on bit (WOB), drill bit revolution, drilling mud circulation rate, drilling mud weight, etc. Thus, it should be appreciated that the information provided by the systems and related methods of the present disclosure may be used to identify hole cleaning efficiency and potential well bore stability issues.

It should be understood that the teachings of the present disclosure are susceptible to numerous variants. For example, the sensor assembly 40 may be positioned at any location so long as the solids are substantially free of liquids, comprise all or substantially all of the solids recovered from the wellbore, and have a constant velocity. Illustrated in FIG. 4, is one such non-limiting variant of the present disclosure.

Figure 4:
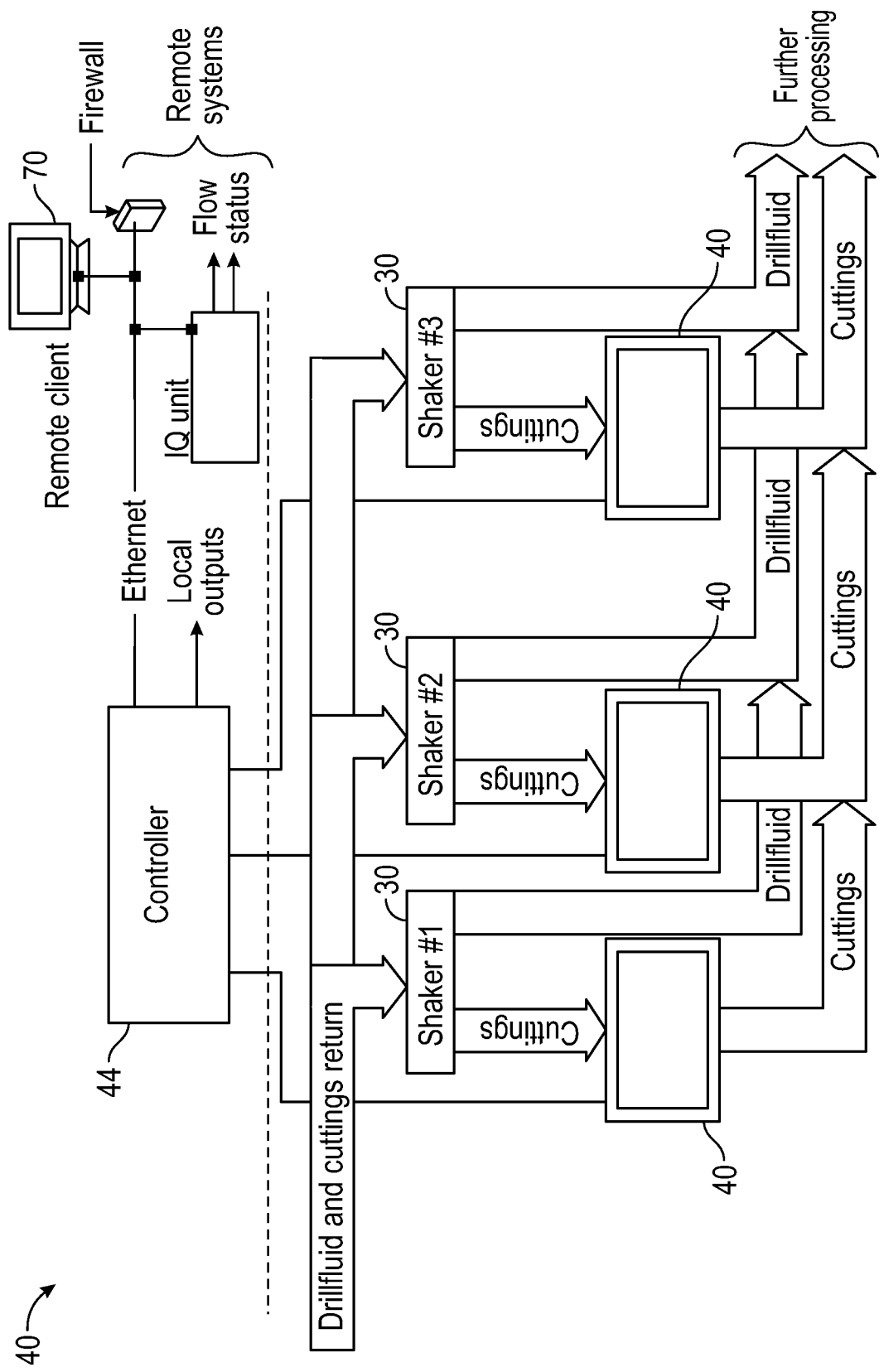
FIG. 4 schematically illustrates another solids evaluator in accordance with one embodiment of the present disclosure.

In FIG. 4, the solids evaluator 40 includes a sensor assembly 40 positioned at each of the shakers 30. While three sensor assemblies 40 are shown, greater or fewer may be used. It is desirable to have a sensor assembly 40 associated with every shaker 30 so that all the cuttings retrieved from the wellbore can be evaluated. A rig side control unit 44 is in signal communication with the sensor assemblies 44. The rig side control unit 44 can provide local personnel with real time or near real time information related to solids flow rates. Additionally, the rig side control unit 44 can be in signal communication with a remote system 70 and provide remote personnel with similar information. The remote system 70 may be on the rig, at another offshore site, or an onshore site.

While the foregoing disclosure is directed to the preferred embodiments of the disclosure, various modifications will be apparent to those skilled in the art. It is intended that all variations within the scope of the appended claims be embraced by the foregoing disclosure.

What is claimed is:

1. A method for estimating a parameter relating to solids recovered from a wellbore, comprising:
    separating the solids from a drilling fluid recovered from the wellbore;
    flowing the solids at a constant velocity through a microwave field;
    generating signals by a sensor assembly representative of a mass of the flowing solids, wherein the sensor assembly is calibrated to only measure moving solids as opposed to deposits and/or build ups; and
    estimating a mass flow rate of the solids using the generated signals.

2. The method of claim 1, further comprising estimating a volumetric flow rate using the estimated mass flow rate and an estimated density of the solids.

3. The method of claim 2, further comprising comparing the estimated volumetric flow rate with a theoretical volumetric flow rate.

4. The method of claim 3, further comprising adjusting at least one drilling parameter based on the comparison of the estimated volumetric flow rate with the theoretical volumetric flow rate.

5. A method for estimating a parameter relating to solids recovered from a wellbore, comprising:
    drilling the wellbore using a bottomhole assembly;
    conveying the solids in the wellbore to a surface location using a drilling fluid;
    separating the drilling fluid from the solids using at least one shaker;
    conveying all of the separated solids recovered from the wellbore by using a conveyor;
    continuously dropping the solids into a solids evaluator positioned vertically above a dryer, wherein the solids evaluator includes:
    a chute having a vertically aligned bore, the chute having a length selected to allow the dropped solids to reach a constant velocity,
    a sensor assembly generating a microwave field in a section of the chute where the dropped solids have the constant velocity, and
    a control unit in signal communication with the sensor assembly, the control unit being configured to estimate a mass flow rate of the solids based on signals by the sensor assembly;
    generating the signals representative of a mass flow rate of the dropped solids using the sensor assembly;
    using the control unit to estimate the mass flow rate of the solids based on the generated signals; and
    drying the solids in the dryer
    wherein the flow of solids is uninterrupted prior to entering the microwave field.

6. The method of claim 5, further comprising estimating a volumetric flow rate of the dropped solids by using the estimated mass flow rate and an estimated density of the dropped solids.

7. The method of claim 5, wherein the estimated density is based on an analysis of a formation through which the wellbore is being drilled.

8. The method of claim 5, wherein the dropped solids free fall through the chute.

9. The method of claim 5, further comprising adjusting at least one drilling parameter based on the estimated mass flow rate of the solids.

10. The method of claim 9, further comprising comparing the estimated mass flow rate of the solids to a theoretical mass flow rate of the solids.

11. The method of claim 5, wherein the separating of the drilling fluid from the solids is performed using a plurality of shakers.

12. The method of claim 5, wherein the microwave field completely traverses a cross-sectional flow path of the dropped solids and is perpendicular to the flow of the dropped solids.

13. An apparatus for estimating a parameter relating to solids recovered from a wellbore, the apparatus comprising:
- a conveyor conveying the solids recovered from a wellbore;
- a chute having a vertically aligned bore receiving the solids from the conveyor, the chute having a length selected to allow the solids to reach a constant velocity,
- a sensor assembly generating a microwave field in a section of the chute where the solids have the constant velocity, the sensor assembly generating signals representative of a mass flow rate of the solids, wherein the sensor assembly is calibrated to only measure moving solids as opposed to deposits and/or build ups, and
- a control unit in signal communication with the sensor assembly, the control unit being configured to estimate a mass flow rate of the solids based on the generated signals.

14. The apparatus of claim 13, wherein the microwave field completely traverses a cross-sectional flow path of the dropped and is perpendicular to the flow of the dropped solids.

15. The apparatus of claim 13, wherein the chute is oriented to allow the dropped solids to free fall through the chute.

* * * * *